US009657583B2

United States Patent
Marchal et al.

(10) Patent No.: US 9,657,583 B2
(45) Date of Patent: May 23, 2017

(54) COMPOSITE MATERIAL REINFORCING PART OF PI-SHAPED SECTION, IN PARTICULAR A PLATFORM FOR A TURBINE ENGINE FAN, AND ITS METHOD OF FABRICATION

(71) Applicant: SNECMA, Paris (FR)

(72) Inventors: Yann Marchal, Melun (FR); Jean-Noel Mahieu, Paris (FR)

(73) Assignee: SNECMA, Paris (FR)

( * ) Notice: Subject to any disclaimer, the term of this patent is extended or adjusted under 35 U.S.C. 154(b) by 463 days.

(21) Appl. No.: 14/371,280

(22) PCT Filed: Jan. 7, 2013

(86) PCT No.: PCT/FR2013/050027
§ 371 (c)(1),
(2) Date: Jul. 9, 2014

(87) PCT Pub. No.: WO2013/104853
PCT Pub. Date: Jul. 18, 2013

(65) Prior Publication Data
US 2014/0363299 A1 Dec. 11, 2014

Related U.S. Application Data

(60) Provisional application No. 61/584,422, filed on Jan. 9, 2012.

(51) Int. Cl.
*F01D 11/00* (2006.01)
*B29C 70/68* (2006.01)
(Continued)

(52) U.S. Cl.
CPC ............ *F01D 11/008* (2013.01); *B29C 70/24* (2013.01); *B29C 70/682* (2013.01);
(Continued)

(58) Field of Classification Search
CPC ...... F01D 11/008; F01D 5/30; F05D 2300/44; F05D 2300/603; F05D 2300/6034;
(Continued)

(56) References Cited

U.S. PATENT DOCUMENTS

| 6,874,543 B2 | 4/2005 | Schmidt et al. |
| 2003/0056847 A1 | 3/2003 | Schmidt et al. |
| 2010/0167007 A1 | 7/2010 | Goering |

OTHER PUBLICATIONS

International Search Report Issued Nov. 20, 2013 in PCT/FR13/050027 filed Jan. 7, 2013.

*Primary Examiner* — Richard Edgar
*Assistant Examiner* — Jesse Prager
(74) *Attorney, Agent, or Firm* — Oblon, McClelland, Maier & Neustadt, L.L.P.

(57) ABSTRACT

A reinforcing part of π-shaped section made out of composite material, and a method of making the part, the method including: making a first set of layers of interlinked yarns by three-dimensional weaving to form a first fiber blank portion to form a base preform; making a second set of layers of interlinked yarns by three-dimensional weaving to form a second fiber blank portion to form a stiffener preform, yarns of the second set being interlinked with yarns of the first set by weaving over a central interlinked strip that flares towards side edges of the first fiber blank portion in a zone corresponding to the step of the base; shaping the two fiber blank portions to obtain a single-piece fiber preform having a portion forming a base preform and a portion forming a stiffener preform; and depositing a resin in the fiber preform to form a matrix.

13 Claims, 3 Drawing Sheets

(51) Int. Cl.
- *D03D 25/00* (2006.01)
- *B29C 70/24* (2006.01)
- *B29D 99/00* (2010.01)
- *B29L 31/08* (2006.01)

(52) U.S. Cl.
CPC ....... *D03D 25/005* (2013.01); *B29D 99/0025* (2013.01); *B29L 2031/08* (2013.01); *F05D 2300/44* (2013.01); *F05D 2300/603* (2013.01); *Y10T 428/24636* (2015.01)

(58) Field of Classification Search
CPC .... D03D 25/005; B29C 70/782; B29C 45/14; B29C 45/16; B29D 99/0025; Y10T 428/24264; Y10T 428/24628; Y10T 428/24636; Y10T 428/24653; Y10T 428/24174; Y10T 428/24182

See application file for complete search history.

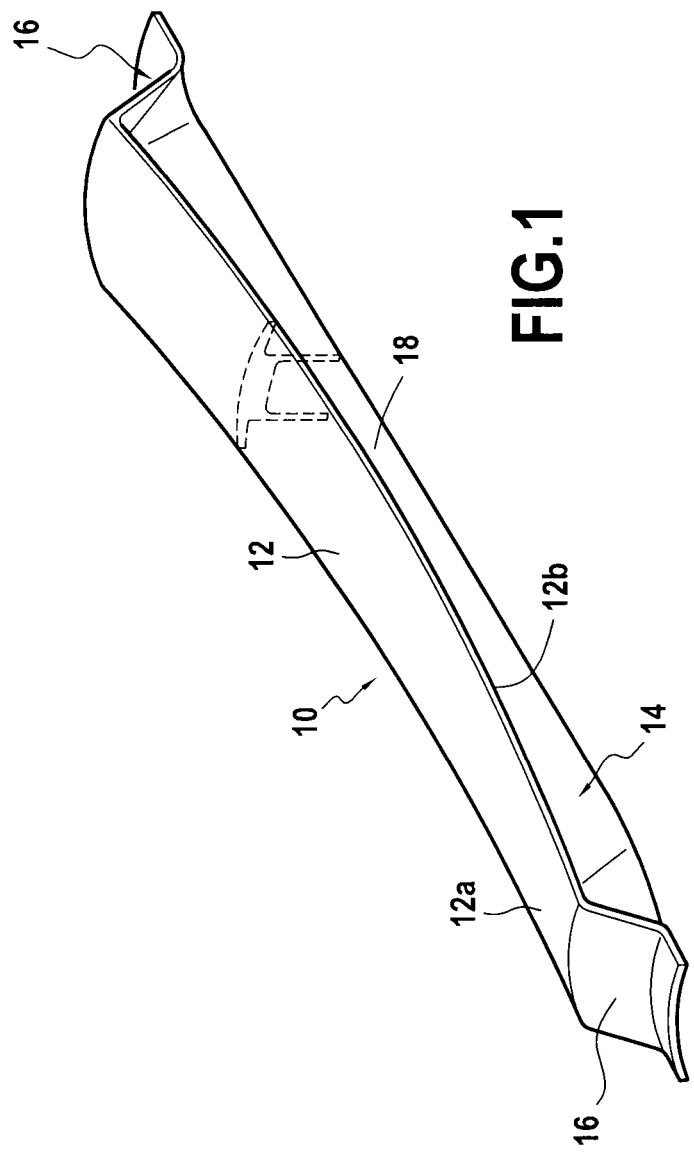

COMPOSITE MATERIAL REINFORCING PART OF PI-SHAPED SECTION, IN PARTICULAR A PLATFORM FOR A TURBINE ENGINE FAN, AND ITS METHOD OF FABRICATION

BACKGROUND OF THE INVENTION

The present invention relates to the general field of reinforcing parts of π-shaped section that are made of composite material comprising fiber reinforcement densified with a matrix.

A field of application is that of platforms for turbine engine fans.

The fan platforms of a turbine engine, in particular of a turbojet, are arranged between the blades of the fan so as to extend its inlet cone. They serve in particular to define the inside of the annular inlet passage for admitting air into the fan, said passage being defined on the outside by a casing.

A fan platform may be attached to the structure of the engine by means of steps that are formed at the front and at the rear of the platform. The steps are then received under rims of the structure of the engine so as to retain the platform against the effect of the centrifugal force due to the speed of rotation of the fan. The centrifugal force due to the rotation of the fan also has the effect of causing the platform to bulge outwards in its middle. Thus, in order to ensure that the platforms behave properly and in order to avoid them moving excessively, it is necessary to stiffen these parts by giving them legs or tabs that extend under their bases.

Furthermore, having recourse to thermostructural composite materials, and in particular organic matrix composite (CMC) materials has become common practice when making fan blades. Compared with metal alloys, such materials present better high temperature performance and they weigh less.

OBJECT AND SUMMARY OF THE INVENTION

It is therefore desirable also to have fan platforms, and more generally turbine engine reinforcing parts, that are made of composite material, particularly but not exclusively out of thermostructural composite material such as OMC material.

To this end, the invention provides a method of fabricating a reinforcing part of π-shaped section out of composite material, the part comprising a first portion forming a base that presents a step at at least one of its longitudinal ends, and a second portion forming a stiffener having two legs that extend from a face of the base over at least a fraction of the length thereof, the method comprising:
  making a first set of a plurality of layers of yarns that are interlinked by three-dimensional weaving to form a first fiber blank portion that is to form a base preform;
  making a second set of a plurality of layers of yarns that are interlinked by three-dimensional weaving to form a second fiber blank portion that is to form a stiffener preform, yarns of the second set of layers of yarns being interlinked by weaving with the yarns of the first set of layers of yarns in a central interlinked strip extending longitudinally between the two longitudinal ends of the first fiber blank portion and flaring towards the side edges thereof in a zone corresponding to the step of the base;
  shaping the two fiber blank portions to obtain a single-piece fiber preform having a portion forming a base preform and a portion forming a stiffener preform; and
  depositing a resin in the fiber preform so as to obtain a composite material reinforcing part comprising fiber reinforcement constituted by the preform that is densified by the matrix.

The method of the invention provides for interlinking the two sets of layers of yarns along a central interlinked strip that flares in a zone of the first blank portion that corresponds to the step of the base. The particular shape of the interlinking that results therefrom between the two sets of layers of yarns thus makes it possible, during shaping, to form the leg blanks of the stiffener of the reinforcing part in spite of the presence of the step. In particular, in the region of the step, the leg blanks may be formed without creating folds in their length that might otherwise give rise to buckling phenomena.

Compared with three-dimensional weaving of a fiber blank for the reinforcing part as a single piece, the method of the invention presents the advantage of being much simpler to implement. In particular, the shaping of the portions making up the fiber blank does not require the preform to be cut, nor does it require numerous and difficult operations of positioning folds relative to one another.

Furthermore, the method of the invention makes it possible to obtain a fiber preform that is particularly robust since the two fiber blank portions that make it up are interlinked by weaving. When applied to fabricating a turbine engine fan platform, the method of the invention thus contributes to imparting the mechanical properties for such a platform, in particular at the connection between the base-forming portion and the stiffener-forming portion.

According to an advantageous feature of the method, the interlinking of the yarns of the second set of layers of yarns and the yarns of the first set of layers of yarns by weaving is obtained by crossing said yarns respectively along the interlinked strip. Such interlinking may thus be obtained without adding additional yarns, thereby avoiding stiffening the preform.

When the base of the reinforcing part presents a step at both of its longitudinal ends, the interlinked strip between the yarns of the first and second sets of layers of yarns flares advantageously toward the side edges of the first fiber blank portion in each of the zones corresponding to the steps of the base. Under such circumstances, and preferably, upstream from the zone corresponding to the upstream step of the base and downstream from the zone corresponding to the downstream step of the base, the interlinked strip between the yarns of the first and second sets of layers of yarns extends transversely over the entire width of said first fiber blank portion. The terms "upstream" and "downstream" are used herein relative to the direction of weaving.

Preferably, shaping comprises forming at least one step by folding the two fiber blank portions along a common, substantially-transverse fold line. Likewise, the shaping of the second fiber blank portion comprises folding the non-interlinked portions of the second fiber blank portion in a direction that is substantially perpendicular to the first fiber blank portion so as to form two leg preforms.

The invention also provides a reinforcing part of π-shaped section made of composite material, comprising a base-forming first portion that presents a step at at least one of its longitudinal ends, and a stiffener-forming second portion having two legs that extend from a face of the base over at least a fraction of the length thereof, the first and second portions being interlinked along a central interlinked strip that extends longitudinally between the two longitudinal ends of the first portion and that flares towards the side edges thereof in a zone corresponding to the step of the base.

The reinforcing part may be made of organic matrix composite material.

According to a feature of the reinforcing part, the first and second portions are interlinked by respective crossings of the yarns that constitute them in the interlinked strip.

According to another feature of the reinforcing part, downstream from the zone of the first portion corresponding to the step of the base, the interlinked strip between the first and second portions extends transversely over the entire width of said first portion.

The first portion of the reinforcing part may include a step at each of its longitudinal ends.

The reinforcing part may constitute a fan platform of a turbine engine.

The invention also provides a turbine engine fitted with at least one fan platform as defined above.

BRIEF DESCRIPTION OF THE DRAWINGS

Other characteristics and advantages of the present invention appear from the following description made with reference to the accompanying drawings that show an implementation having no limiting character. In the figures:

FIG. 1 is a diagrammatic view of a turbine engine fan platform obtained by the method of the invention;

DETAILED DESCRIPTION OF THE INVENTION

Figure 4:
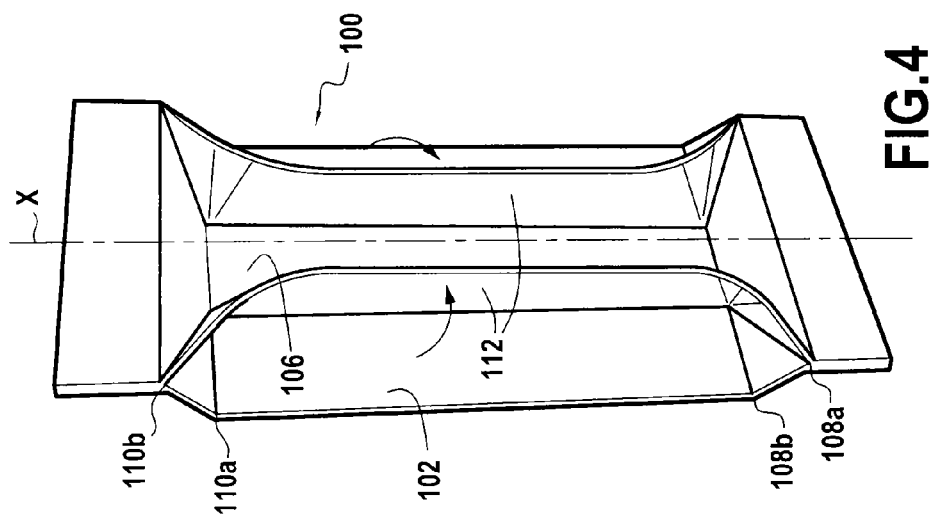
FIGS. 3 and 4 show successive steps in making a fiber preform for a platform of the kind shown in FIG. 1 from the fiber blank of FIG. 2.

The invention is applicable to any π-section reinforcing part that comprises a case having a step at at least one of its longitudinal ends and a stiffener having two legs that extend from one face of the base.

A preferred application of the invention is to be found in particular in fabricating platforms for a turbine engine fan, such as the platform shown in FIG. 1.

The platform 10 in FIG. 1 comprises a first portion forming a base 12 and a second portion forming a stiffener 14. The base 12 is substantially elongate in shape with a top face 12a and a bottom face 12b. At each of its longitudinal ends, the base has a respective step 16, i.e. its ends are folded inwards along lines that extend substantially transversely. These steps 16 enable the platform to be fastened to the structure of the turbine engine.

The stiffener 14 of the platform comprises two legs (or tabs) that extend from the inside face 12b of the base over its entire length. The legs serve to stiffen the platform so as to avoid it moving under centrifugal force as a result of the speed of rotation of the fan.

The platform 10 as made in this way presents a section that is π-shaped, as shown by dashed lines in FIG. 1.

Figure 2:
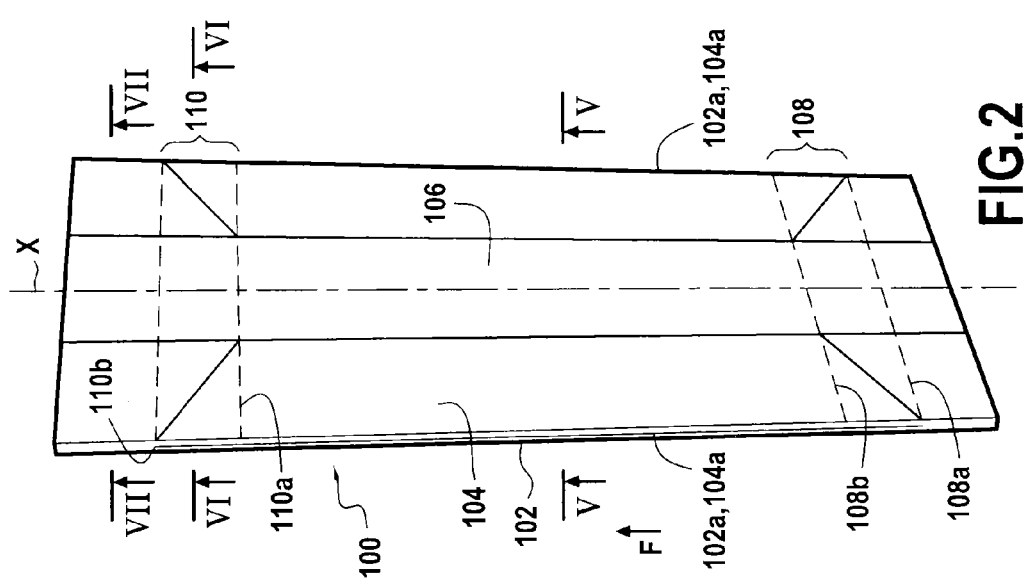
FIG. 2 shows very diagrammatically how the two sets of layers of yarns are arranged in a three-dimensional woven fiber blank for making a fiber preform for a platform of the kind shown in FIG. 1.

FIG. 2 is a highly diagrammatic view of a fiber blank 100 from which a fiber preform for a platform can be shaped, prior to injecting resin or densifying with a matrix, and possibly also machining, in order to obtain a fan platform made of composite material and as shown in FIG. 1.

The blank 100 comprises a first blank portion 102 and a second blank portion 104 obtained by three-dimensional weaving or multilayer weaving, and only the envelopes of these two portions are shown in FIG. 2. After shaping, the first portion 102 is to constitute a portion of the fiber of the platform that corresponds to a base preform. The second portion 104 is intended, after shaping, to constitute another portion of the fiber preform for a platform that corresponds to a stiffener preform.

The two blank portions 102 and 104 are in the form of strips extending generally in a direction X that corresponds to the longitudinal direction of the platform that is to be made. The two fiber blank portions may have the same width and the same length, which width and length are selected as a function of the dimensions of the platform that is to be made.

The two blank portions 102 and 104 are woven simultaneously by three-dimensional weaving without interlinking except along a central strip referred to as the interlinked strip 106 that extends longitudinally between their two longitudinal ends. An example of how the connection is made between the portions of the blank along the central strip is described below with reference to FIGS. 6 to 8.

At each of its longitudinal ends, the central interlinked strip 106 between the two blank portions 102, 104 flares towards the respective opposite sides 102a and 104a of the two blank portions in first and second zones 108 and 110 that correspond to the locations of the steps of the base of the platform.

Thus, in the weaving advance direction F of the two blank portions 102 and 104 as shown in the figure, the interlinked strip 106 extends at an upstream end over the entire width of the blank portion. Starting from a first transverse fold line 108a corresponding to the beginning of the first zone 108 (also referred to as the upstream zone), the width of the interlinked strip narrows to a second transverse fold line 108b corresponding to the end to the first zone 108. At the opposite end, the interlinked strip between the blank portions expands once more (in the transverse direction) from a first transverse fold line 110a corresponding to the beginning of the second zone 110 (also referred to as the downstream zone) to a second transverse fold line 110b corresponding to the end of the second zone 110 from which the interlinked strip extends over the entire width of the blank portions.

Figure 3:
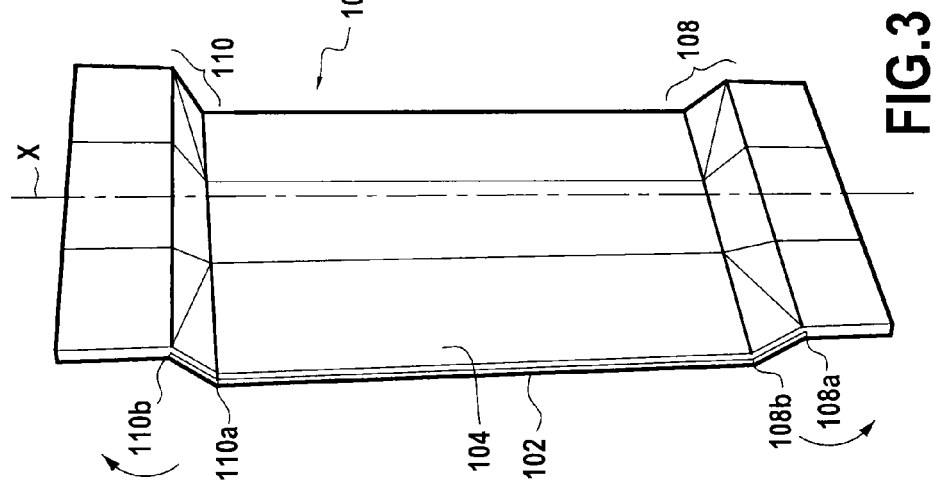

As shown in FIG. 3, the two fiber blank portions 102 and 104 are then folded towards the inside at the above-defined fold lines 108b and 110a (which lines are common to both blank portions). Thereafter, the blank portions are folded towards the outside at the other fold lines 108a and 110b so as to give the two ends of the fiber blank rims suitable for attaching the platform to the structure of the engine. The steps are thus defined by fractions of the blank portions that are defined between the fold lines 108a and 108b for the upstream step and between the fold lines 110a and 110b for the downstream step.

Because of the lack of interlinking between the portions of the fiber blank outside the central interlinked strip 106, the non-interlinked portions 112 of the second blank portion 104 can then be folded (or deployed) inwards so as to form leg preforms (FIG. 4).

The particular shape of the non-interlinked zones between the blank portions in the vicinity of the steps enables leg preforms 112 to be obtained that do not have any folds along their entire length.

A fiber preform for the platform that is to be fabricated is then obtained by molding, with the first fiber blank portion being deformed so as to take on shapes that match the profiles of the blades between which the platform is to be mounted. The final shape may be given by deforming the preform prior to molding or by machining the part after molding. This produces a preform with a base preform portion having its steps and a stiffener preform portion having its two legs (or tabs).

The fibers of the fiber preform are made of a material that is selected as a function of the intended application, e.g. they are made of glass, of carbon, or of ceramic.

The matrix is deposited in the fiber preform in order to obtain a composite material platform while the preform is held in the mold, at least until the preform has been stiffened (or consolidated). The matrix is of a nature that is selected as a function of the intended application, for example an organic matrix obtained in particular from a resin that is a precursor of a polymer matrix such as an epoxy, bismaleimide, or polyimide resin, or a carbon matrix, or a ceramic matrix. With an organic matrix, the fiber preform is impregnated with a composition containing the resin that is a precursor of the matrix, either before being shaped in tooling or after being shaped, in which case impregnation may be performed for example by infusion or by a process of the resin transfer molding (RTM) type. With a carbon matrix or a ceramic matrix, densification may be performed by chemical vapor infiltration (CVI) or by impregnation with a liquid composition that contains a resin that is a precursor for carbon or for ceramic, and then performing pyrolysis or ceramization heat treatment on the precursor, which methods are themselves well known.

The platform is machined to its final dimensions after the fiber preform has been injected/densified.

Figure 5:
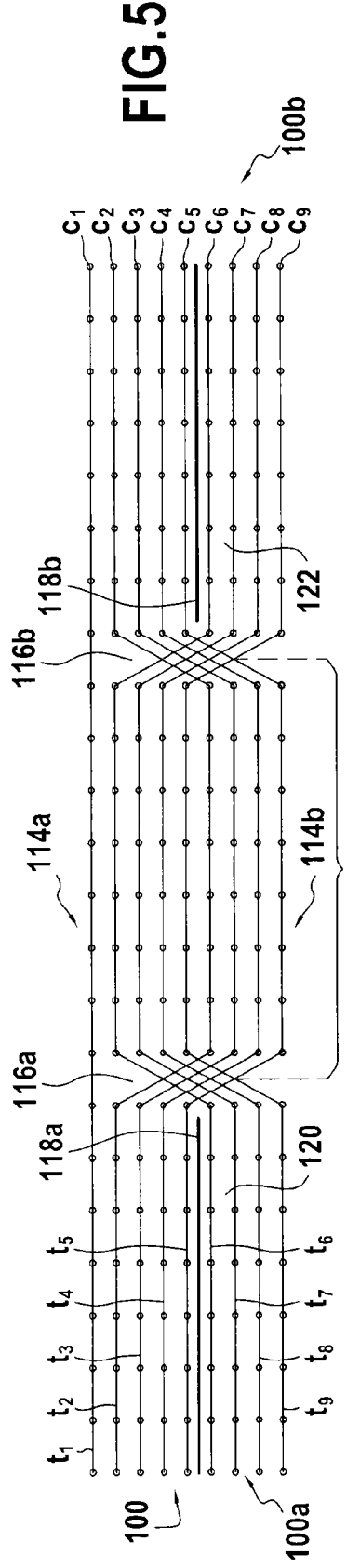
FIGS. 5, 6, and 7 are weft planes of the FIG. 2 fiber blank, respectively on planes V-V, VI-VI, and VII-VII.
Figure 6:
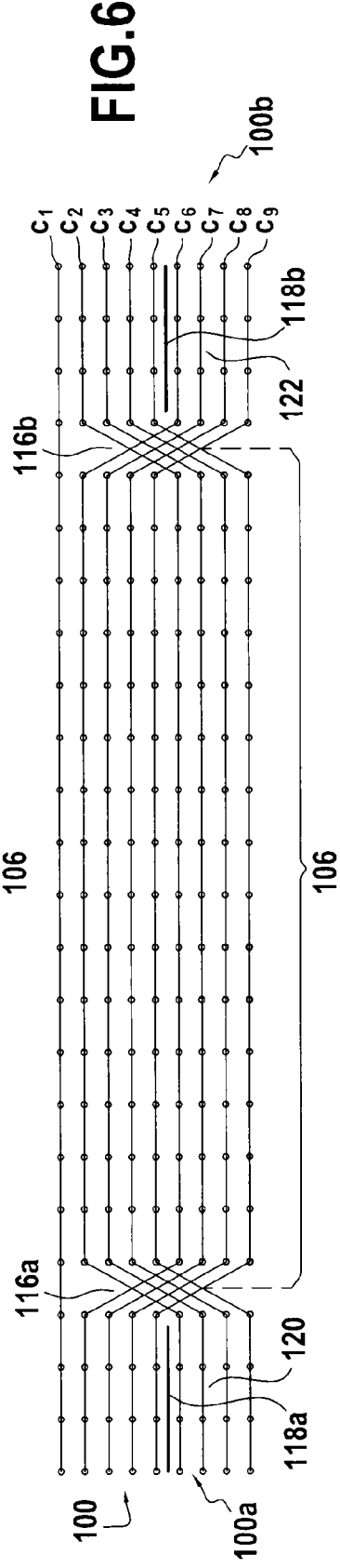
Figure 7:
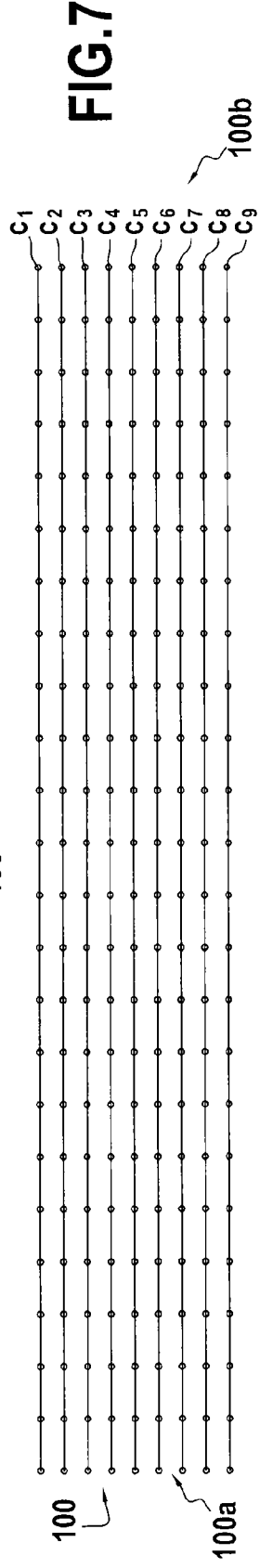

With reference to FIGS. 5 to 7, there follows a description of an example of three-dimensional weaving of the fiber blank 100, and more particularly of the interlinking between the blank portions 102 and 104 along the central strip 106.

FIGS. 5, 6, and 7 are highly diagrammatic views of weft planes of the FIG. 2 fiber blank 100, respectively on planes V-V, VI-VI, and VII-VII. The term "weft" plane of the fiber blank is used to mean a plane perpendicular to the warp yarns and containing a column of weft yarns.

The weft plane V-V corresponds to a plane halfway between the two longitudinal ends of the fiber blank. The weft plane VI-VI lies in the zone 110 corresponding to the location of the downstream step of the base of the platform, while the weft plane VII-VII is downstream from the zone 110 (in the weaving advance direction F).

Between its outer and inner faces 114a and 114b, the fiber blank 100 comprises nine layers of warp yarns $c_1$ to $c_9$ and nine layers of weft yarns $t_1$ to $t_9$, with two crossings between yarns of the group of weft yarns $t_2$ to $t_5$ and the yarns of the group of weft yarns $t_6$ to $t_9$ in crossing zones 116a and 116b.

Non-interlinked zones 118a and 118b, represented by lines in FIGS. 5 to 7, are arranged between adjacent layers of warp yarns, specifically between the layers $c_5$ and $c_6$, these non-interlinked zones extending in the side portions of the fiber blank 100 between its opposite side edges 100a, 100b and the crossing zones 116a and 116b. These non-interlinked zones are zones that are not crossed by weft yarns for the purpose of interlinking warp yarns situated on either side of the non-interlinked zones.

The crossing zones 116a and 116b define between them the central interlinked strip 106 along which the two blank portions are interlinked. Thus, as shown in FIG. 6, the crossing zones 116a and 116b are spaced further apart from each other in weft plane VI-VI of FIG. 2 than in the weft plane V-V. As a result the interlinked strip flares downstream between the two portions of the blank. Similarly, in FIG. 7 that corresponds to the weft plane VII-VII in FIG. 2, there is no longer any non-interlinked zone between the two portions of the blank, such that both portions are interlinked over their entire width and form a single set of layers of yarns.

As mentioned above, after the fiber blank 100 has been woven, the portions 120 and 122 of the blank that are adjacent to the non-linked zones 118a and 118b and to the inside face 114b are deployed towards the inside so as to form the leg preforms 112.

Naturally, the number of layers of warp yarns and of weft yarns in the various portions of the preform (base and legs) could be different from those in the example described, providing three-dimensional weaving is performed in each of these blades.

In addition, the number of yarns in the groups of yarns that cross twice could also be different from the numbers in the example described, providing there is at least one yarn in each group. In particular, there is no need for all of the weft yarns involved in weaving the legs of the preform also to be involved in the two crossings with the weft yarns that are involved in weaving the base.

Alternatively, the interlinking between the blank portions 102 and 104 of the fiber blank along the interlinked strip 106 may be made by adding additional yarns (e.g. by stitching or sewing).

Finally, in the above description, it is naturally possible to interchange the terms "warp" and "weft".

More generally, it should also be observed that the non-interlinked zones created by the above weaving could be obtained in other manners that are themselves known, in particular by de-interlinking in the weave without crossing yarns from the two sets of layers of yarns.

For example, the fiber structure may have a portion corresponding to the above-described central interlinked strip that is formed by three-dimensioned weaving with an interlock weave interlinking the layers of yarns over the entire thickness of the fiber structure, and two portions corresponding to the legs of the platform in which each two adjacent layers of yarns (e.g. the layers $c_5$ and $c_6$ of FIG. 5) are no longer interlinked for linking together a plurality of layers in the thickness of the structure, but are woven with a surface satin weave so as to create two non-interlinked preform portions.

The invention claimed is:

1. A method of fabricating a reinforcing part of π-shaped section out of composite material, the part including a first portion forming a base that presents a step at at least one of its longitudinal ends, and a second portion forming a stiffener including two legs that extend from a face of the base over at least a fraction of the length thereof, the method comprising:

making a first set of a plurality of layers of yarns that are interlinked by three-dimensional weaving to form a first fiber blank portion that is to form a base preform;

making a second set of a plurality of layers of yarns that are interlinked by three-dimensional weaving to form a second fiber blank portion that is to form a stiffener preform, yarns of the second set of layers of yarns being interlinked by weaving with the yarns of the first set of layers of yarns in a central interlinked strip extending longitudinally between the two longitudinal ends of the first fiber blank portion and flaring towards side edges thereof in a zone corresponding to a step of the base;

shaping the two fiber blank portions to obtain a single-piece fiber preform having a portion forming a base preform and a portion forming a stiffener preform; and depositing a resin in the fiber preform to form a matrix to obtain a composite material reinforcing part comprising fiber reinforcement constituted by the preform that is densified by the matrix.

2. A method according to claim 1, wherein the interlinking of the yarns of the second set of layers of yarns and the yarns of the first set of layers of yarns by weaving is obtained by crossing said yarns respectively along the interlinked strip.

3. A method according to claim 1, wherein when the base of the reinforcing part presents a step at both of its longitudinal ends, the interlinked strip between the yarns of the first and second sets of layers of yarns flares toward the side edges of the first fiber blank portion in each of the zones corresponding to the steps of the base.

4. A method according to claim 3, wherein, upstream from the zone corresponding to the upstream step of the base and downstream from the zone corresponding to the downstream step of the base, the interlinked strip between the yarns of the first and second sets of layers of yarns extends transversely over an entire width of the first fiber blank portion.

5. A method according to claim 1, wherein the shaping comprises forming at least one step by folding the two fiber blank portions along a common, substantially-transverse fold line.

6. A method according to claim 1, wherein the shaping of the second fiber blank portion comprises folding the non-interlinked portions of the second fiber blank portion in a direction that is substantially perpendicular to the first fiber blank portion to form two leg preforms.

7. A reinforcing part of π-shaped section made of composite material, comprising:
a base-forming first portion that presents a step at at least one of its longitudinal ends; and
a stiffener-forming second portion including two legs that extend from a face of the base over at least a fraction of a length thereof,
wherein the first and second portions are interlinked along a central interlinked strip that extends longitudinally between the two longitudinal ends of the first portion and that flares towards side edges thereof in a zone corresponding to the step of the base.

8. A reinforcing part according to claim 7, made of organic matrix composite material.

9. A reinforcing part according to claim 7, wherein the first and second portions are interlinked by respective crossings of the yarns that constitute them in the interlinked strip.

10. A reinforcing part according to claim 7, wherein downstream from the zone of the first portion corresponding to the step of the base, the interlinked strip between the first and second portions extends transversely over an entire width of said first portion.

11. A reinforcing part according to claim 7, wherein the first portion includes a step at each of its longitudinal ends.

12. A reinforcing part according to claim 7, constituting a fan platform of a turbine engine.

13. A turbine engine comprising at least one fan platform according to claim 12.

* * * * *